United States Patent [19]

Ruegg

[11] 3,945,620
[45] Mar. 23, 1976

[54] PLASTIC INJECTION MOLDING MACHINE

[75] Inventor: Edwin Ruegg, Netstal, Switzerland

[73] Assignee: Maschinenfabrik u.Giesserei Netstal AG, Switzerland

[22] Filed: Dec. 28, 1973

[21] Appl. No.: 429,650

[30] Foreign Application Priority Data
Jan. 9, 1973  Switzerland............................ 204/73

[52] U.S. Cl. .............................................. 259/191
[51] Int. Cl.² .......................................... B29B 1/06
[58] Field of Search ............ 259/191, 192, 193, 97, 259/9, 10; 425/207, 208, 245; 100/145, 146, 147

[56] References Cited
UNITED STATES PATENTS

| | | | |
|---|---|---|---|
| 3,169,275 | 2/1965 | Compton | 259/191 |
| 3,822,867 | 7/1974 | Evans | 259/191 |
| 3,833,204 | 9/1974 | Hehl | 259/191 |

*Primary Examiner*—Robert W. Jenkins
*Attorney, Agent, or Firm*—McGlew and Tuttle

[57] ABSTRACT

The machine includes a hydraulically operated rotatable and axially displaceable plasticizer and injection screw, and has a frame including a traverse or supporting bridge member. An injection cylinder is secured to one side of the traverse and a plasticizing cylinder, guiding the screw, is secured to the opposite side of the traverse. A hollow, non-rotating piston is guided in the injection cylinder, and a hydromotor is fixedly connected with the injection piston. The hydromotor has a drive shaft extending coaxially through the injection piston and coupled coaxially to the plasticizer and injection screw. The hydromotor, its drive shaft, the injection piston and the plasticizing screw thus form an axially movable coaxial unit mounted for limited axial movement on beams secured on the mold-carrier plate at the nozzle side of the mold. A part of the drive shaft extending out of the injection piston for connection to the screw is preferably sealed in the injection cylinder so that no pressure medium can penetrate from the injection cylinder into the cylinder chamber into which plastic scrap material extends during the return stroke of the screw.

8 Claims, 7 Drawing Figures

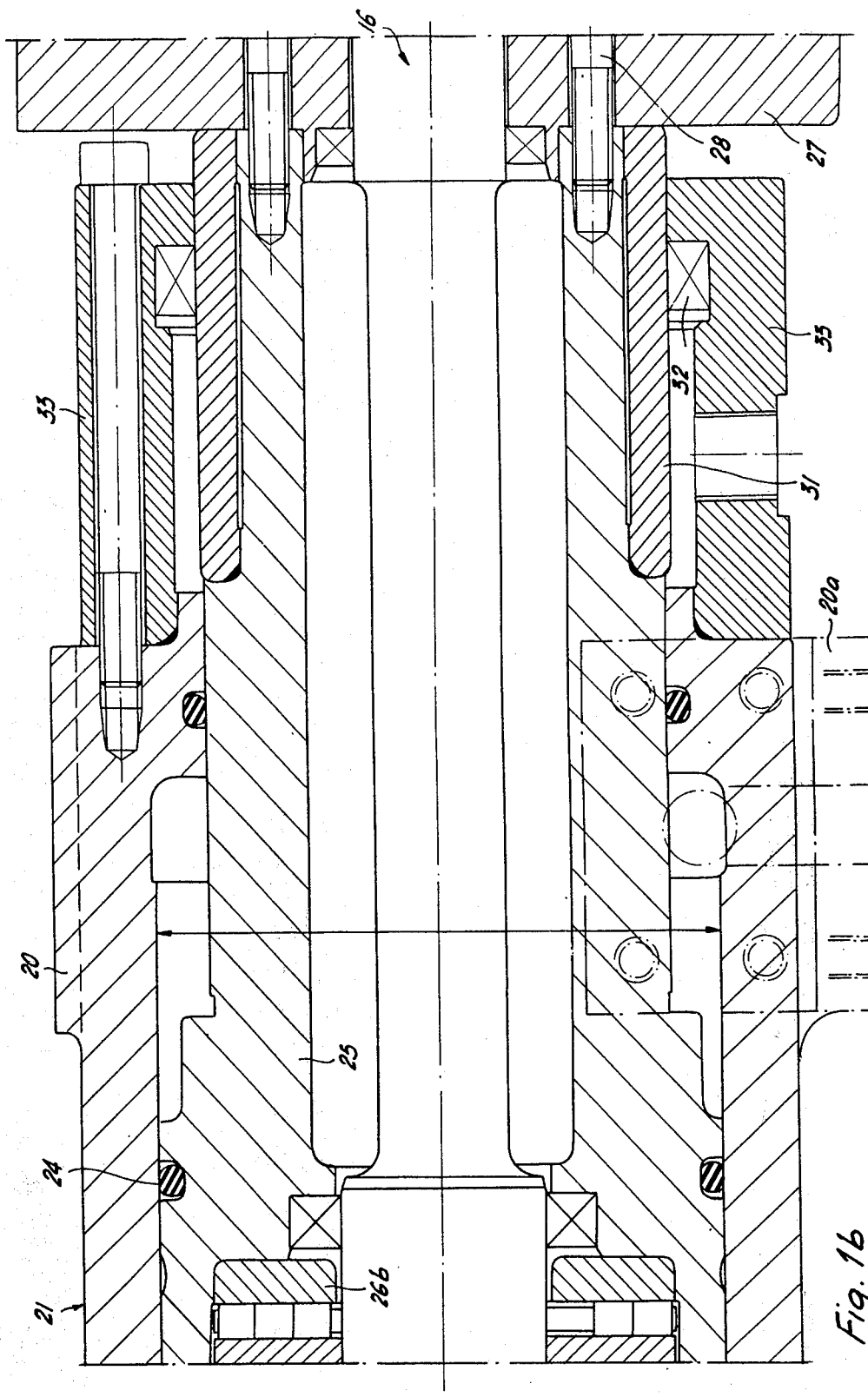

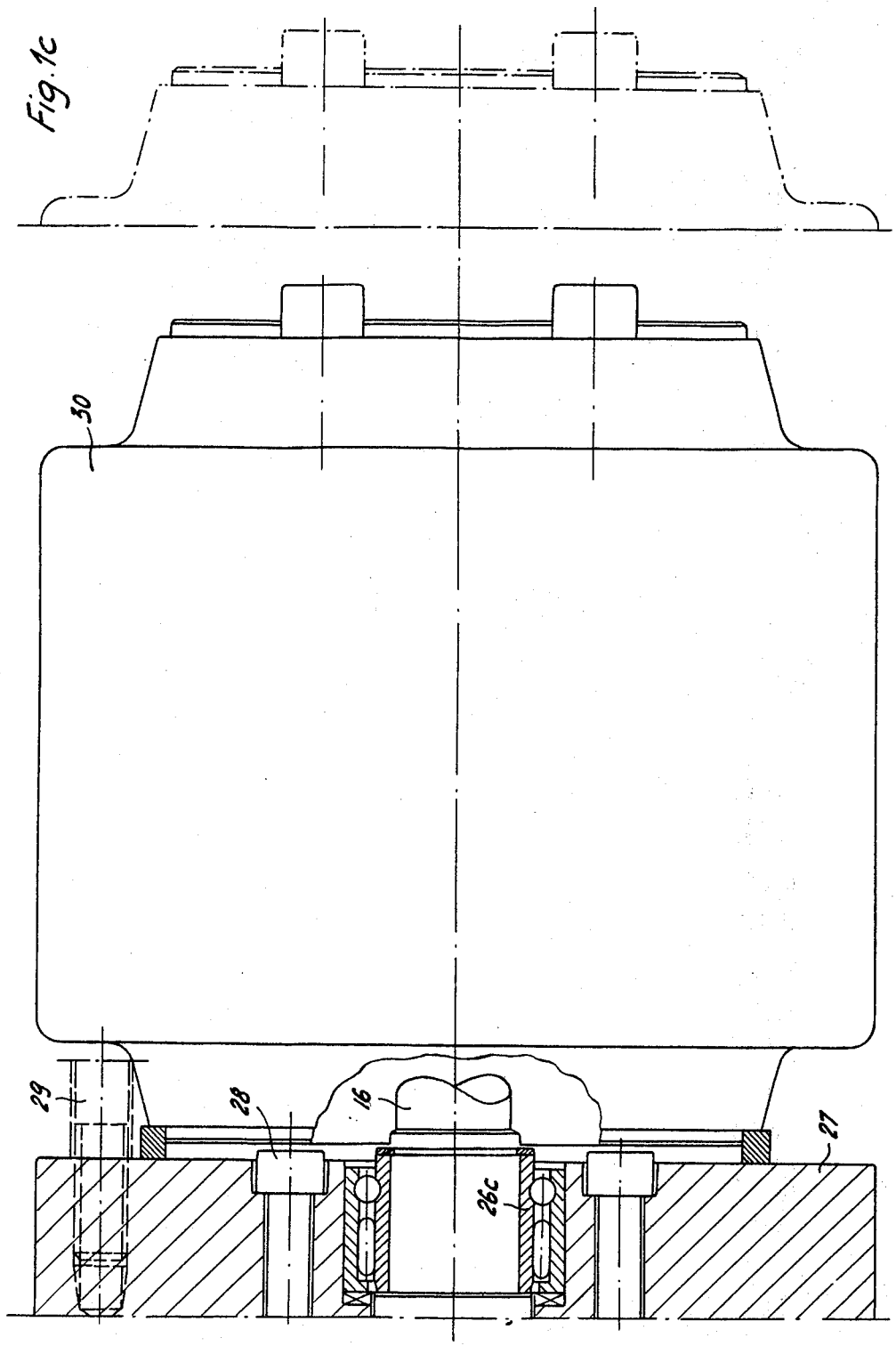

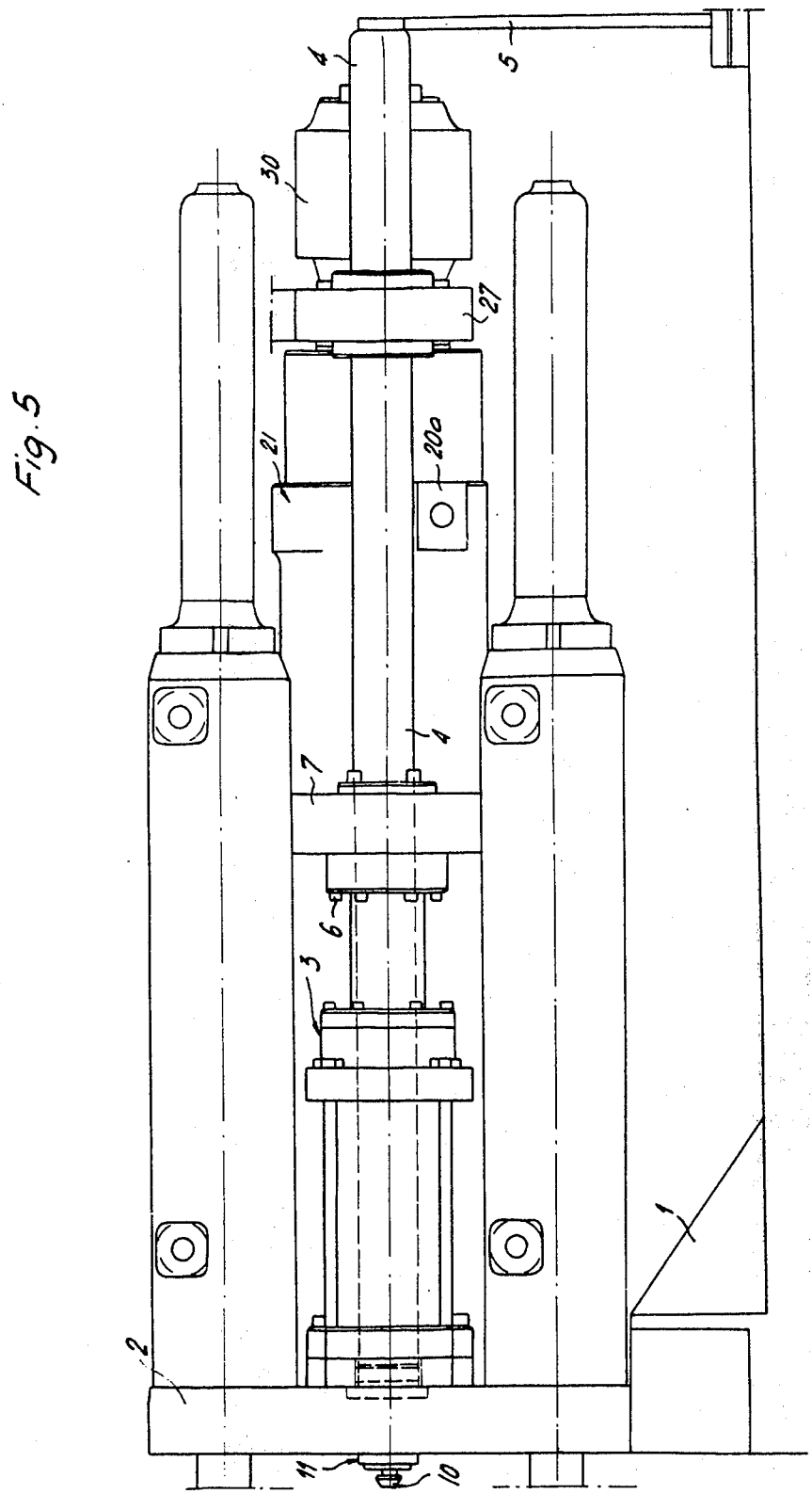

PLASTIC INJECTION MOLDING MACHINE

FIELD AND BACKGROUND OF THE INVENTION

This invention relates to a plastic injection molding machine with a hydraulically operated, rotatable and axially displaceable plasticizer and injection screw.

In known machines of this type, the forces necessary for the forward stroke of the screw, for producing the injection pressure, and for the return of the screw, are produced in axial directions but are exerted in laterally spaced relation to the screw. This requires not only strong force transmission elements but also a relatively large space for these elements. In turn, this results in expensive, large and heavy machines.

SUMMARY OF THE INVENTION

In order to avoid these disadvantages, the objective of the invention is to provide an injection molding machine of the above-mentioned type but wherein the forces to be transmitted to the screw are produced in direct alignment with the screw axis and transmitted to the screw by using solely elements coaxial with the screw. In this way, there is obtained a relatively lightweight, compact, plasticizing, injection and driving unit.

To this end, the machine embodying the invention is characterized by the fact that the drive shaft of a hydromotor, which drive shaft is coupled coaxially with the plasticizing screw for rotating the latter, is mounted in a hollow, nonrotating injection piston fixedly connected with the hydromotor. This piston is guided in an injection cylinder secured to extend from one side of a traverse or supporting bridge member, with the plasticizing cylinder, guiding the screw, being secured to extend from the other side of the traverse.

The hydromotor, its drive shaft, the injection piston and the plasticizing screw thus form an axially moving coaxial unit which, in turn, is guided in the unit formed by the associated injection and plasticizing cylinder and carried by the traverse. This plasticizing, injection and driving unit carried by the traverse preferably is mounted for limited axial movement on beams secured on the mold-carrier plate at the nozzle side of the mold. A part of the drive shaft extending out of the injection piston for connection to the screw preferably is so sealed in the injection cylinder that no pressure medium can penetrate from the injection cylinder into the intercylinder chamber into which plastic abrasions arrive during the return stroke of the screw.

An object of the invention is to provide an improved plastic injection molding machine of the type including a hydraulically operated, rotatable and axially displaceable plasticizer and injection screw.

Another object of the invention is to provide such an injection molding machine in which the forces to be transmitted to the screw are produced directly in alignment with the axis of the screw.

A further object of the invention is to provide such a plastic injection molding machine having a relatively lightweight and compact plasticizing, injection and driving unit.

For an understanding of the principles of the invention, reference is made to the following description of typical embodiments thereof as illustrated in the accompanying drawings.

BRIEF DESCRIPTION OF THE DRAWINGS

In the Drawings:

FIGS. 1a, 1b and 1c conjointly form an axial sectional view of the plasticizing, injection and driving unit of a plastic injection molding machine embodying the invention and carried by a traverse or supporting bridge member;

FIG. 3 is a transverse sectional view taken on the line III—III of FIG. 1a;

FIG. 5 is a side elevation view, to a reduced scale, of the machine units associated with the mold carrier plate on the nozzle side of the mold.

DESCRIPTION OF THE PREFERRED EMBODIMENTS

Figure 1A:
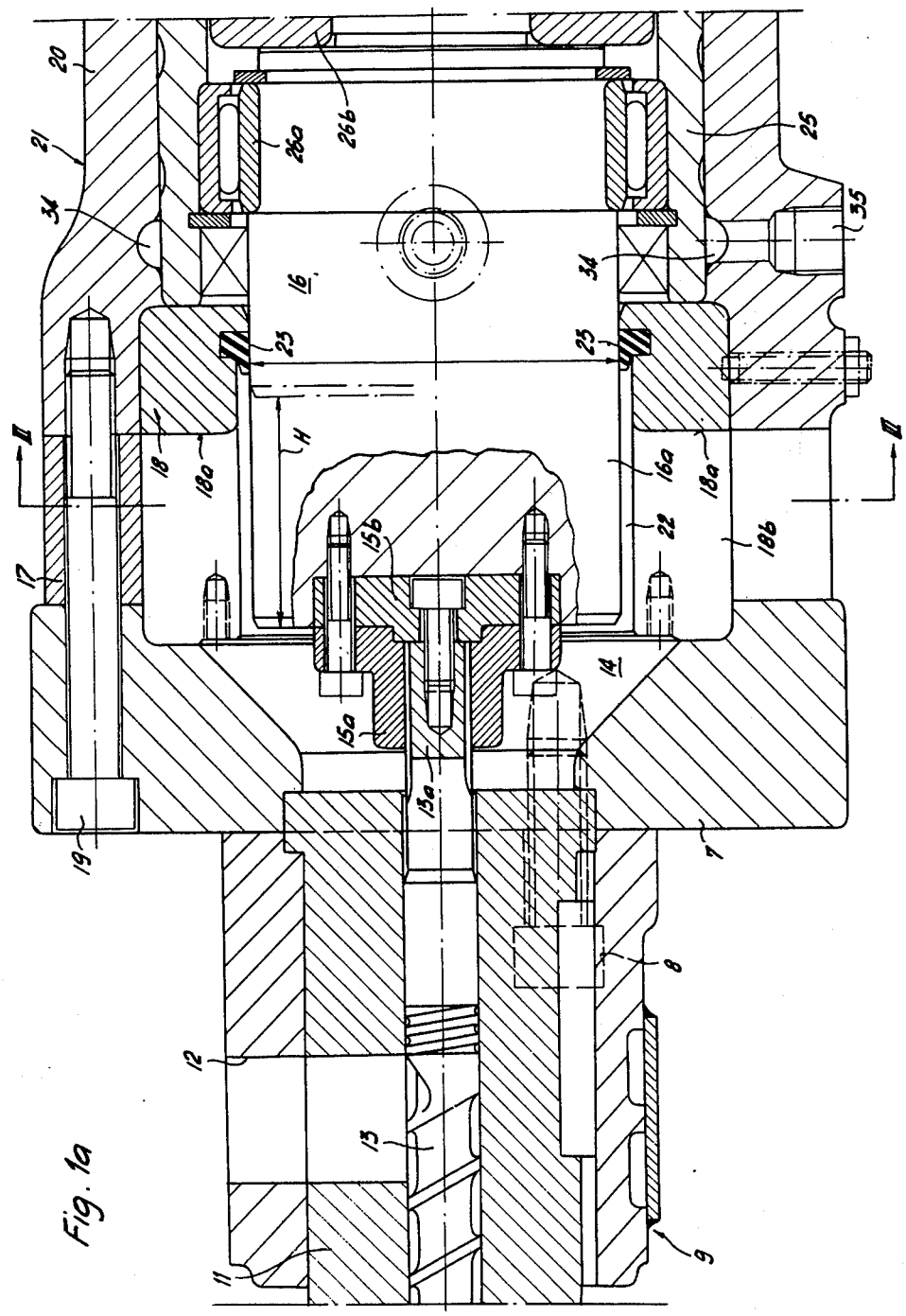
Figure 2:
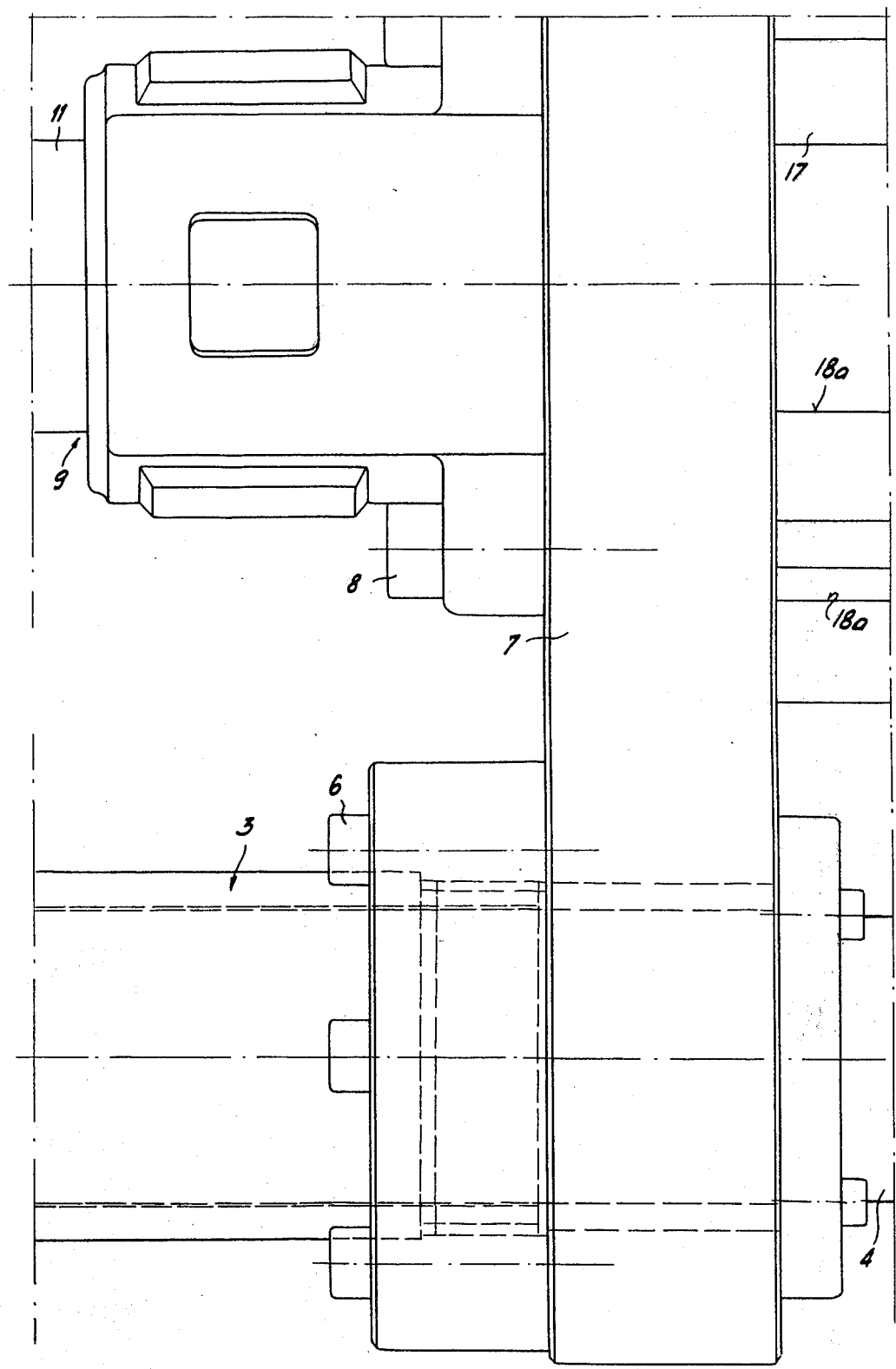
FIG. 2 is a top plan view of the traverse illustrating the place of attachment of the unit and the feed mechanism for the traverse.
Figure 3:
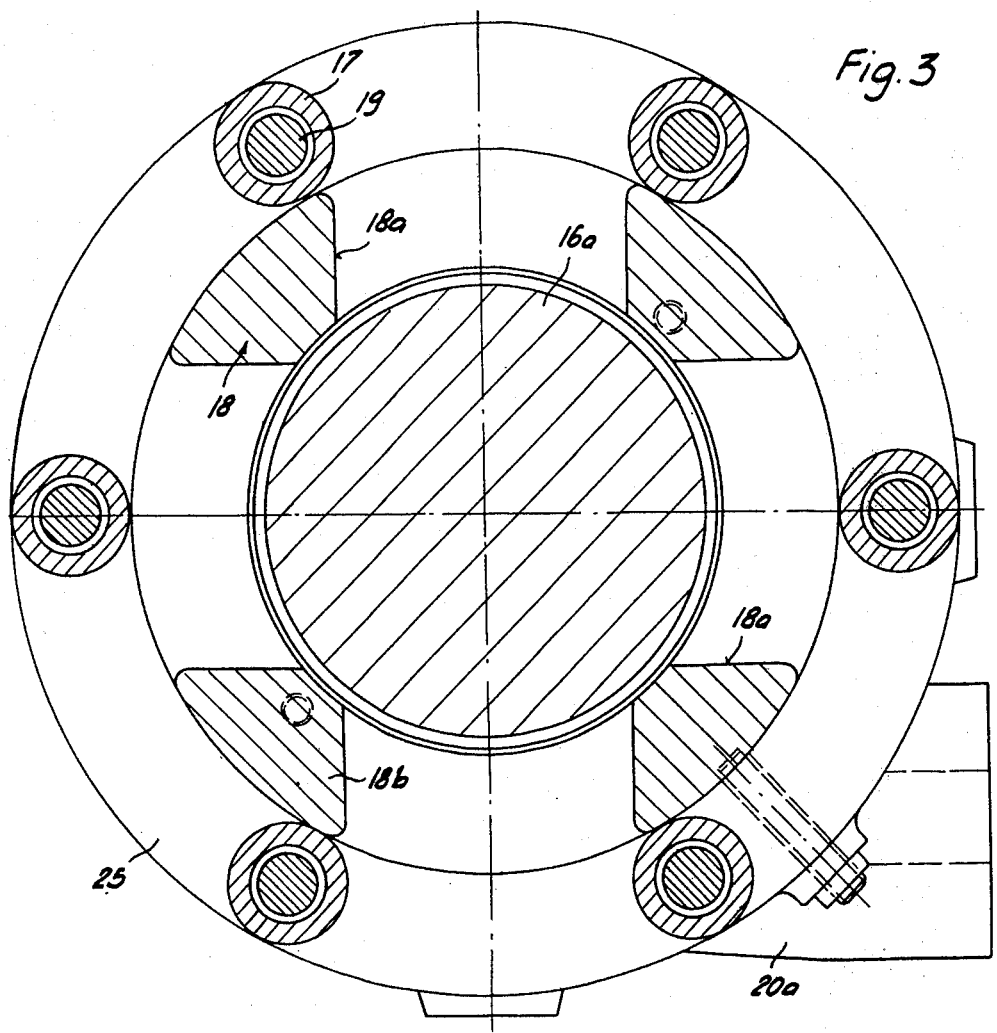

Referring to the drawings, the illustrated plastic injection molding machine embodying the invention is provided, in a known manner, with two mold carrier plates bearing on a machine frame 1, of which only one mold carrier plate 2 is shown in FIG. 5. On mold carrier plate 2, there are secured, on both sides of a central plate opening, hydraulic feed mechanisms 3 with guide beams 4 which are supported by supports 5 on machine frame 1. On the mold side, the feed mechanisms 3 are secured by screws 6 to a traverse or supporting bridge member 7.

On the mold side of traverse 7 and coaxially to the central opening of mold carrier plate 2, there is secured, by means of screws 8, the plasticizing unit 9. Cylinder 11 of plasticizing unit 9, carrying the injection nozzle, is secured on the mold side of traverse 7 and has the usual filling hole 12 adjacent traverse 7. A rotatable and axially movable plasticizing screw 13 is received in cylinder 11. The end part 13a of screw 13, remote from the mold and which extends into a recess 14 of the traverse 17, which recess widens conically to the rear, is secured by two connecting flanges 15a, 15b on the cylindrical head 16a of a drive shaft 16 coaxial to screw 13. Through the medium of intermediate pieces or spacers 17, 18, there is screwed to that side of traverse 7 remote from the mold, by means of screws 19, the cylinder 20 of the hydraulic injection device 21 which is coaxial to screw 13 and to drive shaft 16. The intermediate piece or spacer 18 is designed as a ring which is provided on its side toward traverse 7 with recesses 18a between which are formed cams 18b serving to center injection mold device 21 on traverse 7.

The chamber 22, enclosed by intermediate piece 18 and in communication with the recess 14, is open to the exterior due to the recesses 18a and the spacing between intermediate pieces 17, but is sealed from cylinder 20 by a packing 23 arranged in intermediate piece or spacer 18 and cooperating with drive shaft head 16a. The hollow injection piston 25 is guided in cylinder 20, with the interposition of sealing rings 24, and drive shaft 16 is mounted coaxially of piston 25 through two bearings 26a, 26b. Drive shaft 16 is also mounted, by an additional bearing 26c, in a guide plate 27 arranged behind cylinder 20 of the hydraulic injection device. Screws 28 secure piston 25 to one side of guide plate 27 and screws 29 secure the hydromotor 30, having the drive shaft 16, to the opposite side of guide plate 27. On the end of injection piston 25 adjoining guide plate 27, there is arranged a bush 31 which forms the hydraulic screw-retracting device, in connection with a packing 32 and an auxiliary cylinder 33 secured on cylinder 20.

A connecting portion 20a of cylinder 20 serves to connect an electro-hydraulic control unit to the machine, this control unit not being shown. The control unit contains the control means for the movements of the plasticizing screw, involving axial displacement and rotation, and contains the regulating means for the speed, injection pressure and back pressure stages for the plasticizing screws.

The head 16a of drive shaft 16, arranged in chamber 22, is sealed by the packing 23 throughout the screw stroke range H, so that no leaking medium can arrive from cylinder 20 into chamber 22 and mix there with the plastic abrasions which are rejected during the axial movement of screw 13 into chamber 14, 22, and which plastic abrasion is dropped between the intermediate pieces or spaces 17 out of the plasticizing, injection and driving unit. On the other hand, leaking medium from cylinder 20 is collected in a groove 34 on the internal surface of cylinder 20, and can be returned through an outlet 35 into a pressure medium reservoir which has not been shown.

Figure 4:
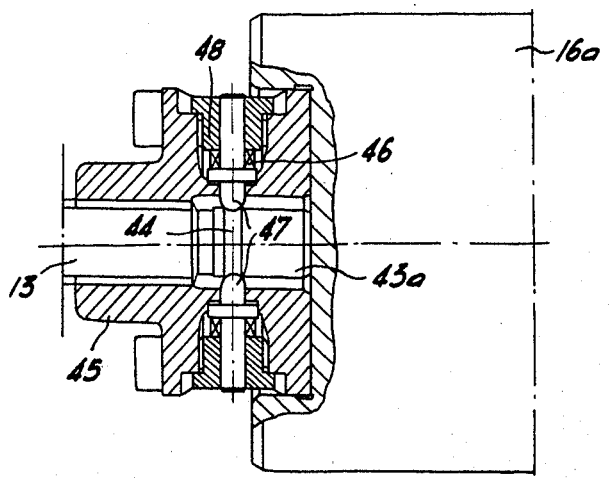
FIG. 4 is an axial sectional view illustrating an embodiment of the connection between the plasticizing screw and the injection piston.

FIG. 4 illustrates a particularly advantageous design of the connection between plasticizing screw 13 and drive shaft head 16a. The offset screw end 43a is formed with a recess 44 which is engaged by radial pins 47 which are loaded or biased by "Schnorr" springs 46 arranged in recesses of a collar or flange 45. The outer ends of springs 46 bear on guide bushes 48 of pins 47, and collar or flange 45 is screwed into the outer end of drive shaft head 16a.

The plasticizing, injection and driving unit described above is very compact, due to the coaxial arrangement of its individual parts, and has short force-transmission paths, which provides a particularly light-weight and space-saving machine construction.

While specific embodiments of the invention, have been shown and described in detail to illustrate the application of the principles of the invention, it will be understood that the invention may be embodied otherwise without departing from such principles.

What is claimed is:

1. In a plastic injection molding machine of the type including a hydraulically operated rotatable and axially displaceable plasticizer and injection screw, the improvement comprising, in combination, a supporting bridge member extending transversely of the injection axis of the machine; a cylinder of a hydraulic injection device secured to one side of said bridge member coaxially with the injection axis; a plasticizing cylinder, guiding said screw, secured to the opposite side of said bridge member coaxially with said first-named cylinder; a hollow, nonrotating injection piston guided in said first-named cylinder; a hydromotor fixedly connected with said injection piston and having a drive shaft extending coaxially through said injection piston; and means coupling said drive shaft coaxially to said screw.

2. In a plastic injection molding machine, the improvement claimed in claim 1, in which said drive shaft has a head secured to the rear end of said screw; and means sealing said head, throughout the entire stroke length, from said first-named cylinder.

3. In a plastic first-named molding machine, the improvement claimed in claim 2, in which said sealing means is a packing sealing said injection cylinder from a chamber facing said plasticizing cylinder; said chamber being open to the exterior.

4. In a plastic injection molding machine, the improvement claimed in claim 3, in which the chamber in the first-named cylinder, rearwardly of said packing, is connected, through a collecting groove on the interior surface of said first-named cylinder, with an outlet for any leaking fluid medium.

5. In a plastic injection molding machine, the improvement claimed in claim 4, including intermediate spacers interposed between said first-named cylinder and said bridge member; the chamber defined by said intermediate spacers and open to the exterior communicating with a conical recess in said opposite side of said bridge member; the end of said plasticizing cylinder being secured in said conical recess.

6. In a plastic injection molding machine, the improvement claimed in claim 5, including a collar screwed onto the head of said drive shaft; and spring loaded radial pins mounted in said collar with their inner ends engaging an annular recess in the end of said screw projecting from said plasticizing cylinder.

7. In a plastic injection molding machine, the improvement claimed in claim 1, including a machine frame; a mold carrier plate mounted on said machine frame on the nozzle side of a mold; hydraulic feed mechanisms for the plasticizing, injection and driving unit secured to said mold carrier plate; said plasticizing, injection and driving unit being guided on beams supported on said machine frame and in cylinders of said hydraulic feed mechanisms.

8. In an injection molding machine, the improvement claimed in claim 1, in which said first-named cylinder has a connection portion extending laterally therefrom for mounting an electro-control unit for controlling the screw movements and for regulating the speed, injection pressure and back pressure stages of the screw.

* * * * *